United States Patent
Graton et al.

[11] Patent Number: 5,820,466
[45] Date of Patent: Oct. 13, 1998

[54] FRICTION UNIT AND A METHOD OF MAKING IT, AND A TORSION DAMPER INCLUDING SUCH A FRICTION UNIT

[75] Inventors: Michel Graton, Paris; Michel Blard, Issy Les Moulineaux, both of France

[73] Assignee: Valeo, Paris, France

[21] Appl. No.: 825,175

[22] Filed: Mar. 31, 1997

Related U.S. Application Data

[63] Continuation of Ser. No. 264,328, Jun. 23, 1994, abandoned.

[30] Foreign Application Priority Data

Jun. 23, 1993 [FR] France .................. 93 07630

[51] Int. Cl.⁶ .................................................. F16D 3/25
[52] U.S. Cl. .................. 464/68; 192/213.22; 192/213.31
[58] Field of Search .................. 464/64, 66, 68; 192/213.22, 213.31

[56] References Cited

U.S. PATENT DOCUMENTS

| | | | |
|---|---|---|---|
| 4,533,031 | 8/1985 | Nagano | 464/68 X |
| 4,537,296 | 8/1985 | Lech, Jr. et al. | 464/68 X |
| 4,573,562 | 3/1986 | De Land | 192/106.2 |
| 4,635,780 | 1/1987 | Wiggen | 192/106.2 |
| 4,928,805 | 5/1990 | Takeuchi et al. | 192/106.2 |
| 4,998,608 | 3/1991 | Raab et al. | 192/106.2 |
| 5,059,155 | 10/1991 | Tojima | 464/68 |

FOREIGN PATENT DOCUMENTS

| | | |
|---|---|---|
| 2370902 | 6/1978 | France . |
| 2532018 | 2/1984 | France . |
| 2430160 | 2/1975 | Germany . |

*Primary Examiner*—Donald P. Walsh
*Assistant Examiner*—Emmanuel M. Marcelo
*Attorney, Agent, or Firm*—Longacre & White

[57] ABSTRACT

A torsion damper, especially for a motor vehicle friction clutch, includes a friction unit, or unitary friction assembly, that comprises a guide ring, at least one drive ring, and axially acting resilient members in biassing relationship on the drive ring. The drive ring and these resilient members are mounted in a cavity which is bounded by the guide ring and by a closure ring which is secured to the guide ring. The closure ring is formed at its inner periphery with at least two axial stop lugs for preventing rotation. The stop lug penetrates into an associated aperture which is formed in the guide ring.

5 Claims, 10 Drawing Sheets

FIG. 12
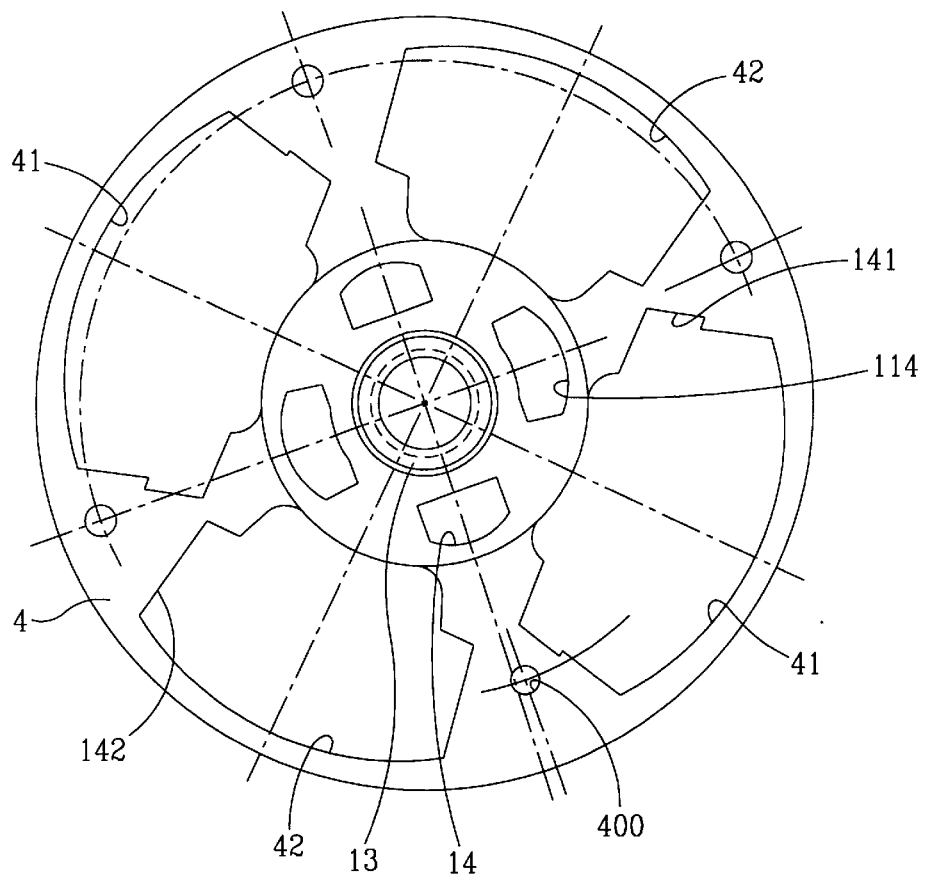
FIG. 13
FIG. 14
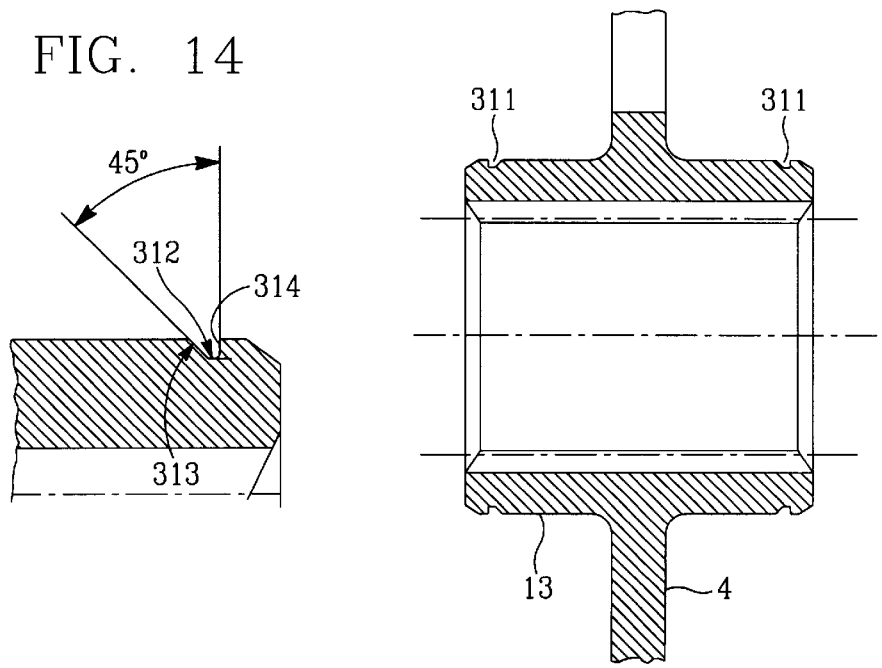

FRICTION UNIT AND A METHOD OF MAKING IT, AND A TORSION DAMPER INCLUDING SUCH A FRICTION UNIT

This is a continuation of application Ser. No. 08/264,328, filed Jun. 23, 1994, which was abandoned upon the filing hereof.

FIELD OF THE INVENTION

The present invention relates to a unitary friction assembly (or friction unit) for a torsion damper, and in particular for a torsion damper of or comprising a friction clutch for a motor vehicle, the torsion damper being of the kind comprising a guide ring for receiving circumferentially acting resilient means, at least one drive ring adapted for engagement with a damper plate of the damper, and axially acting resilient means in biassing relationship with the drive ring.

The invention is also concerned with a method of fitting such a friction unit, and a torsion damper which includes such a friction unit or unitary assembly.

BACKGROUND OF THE INVENTION

Arrangements as described above are further described for example in U.S. Pat. No. 4,222,475 and the corresponding French published patent application No. FR 2 370 902A. In those documents, the friction unit is mounted axially between the damper plate and the guide ring of the torsion damper. The assembly includes leaf spring elements which are part of the axially acting resilient means, such that, before final assembly on to the other components of the torsion damper, the leaf spring elements run the risk of being damaged, especially during the various handling and transport operations involved, because they are exposed. In addition, these leaf spring elements are sensitive to the effects of circumferential forces. In addition, problems of control and optimisation of the elastic load exerted by the leaf spring elements are found to arise.

In order to overcome these various drawbacks, it may be thought that recourse could be had to the arrangement described in U.S. Pat. No. 4,573,562, in which the resilient means are mounted within a cavity which is delimited by the guide ring and by a closure ring which is secured to the guide ring. A thrust ring is interposed between the axially acting resilient means and the drive ring. This thrust ring has at its inner periphery axially oriented portions such that it is not of simple form. In addition, the friction unit is not as rigid as is desirable at its inner periphery.

DISCUSSION OF THE INVENTION

An object of the present invention is to overcome the above mentioned drawbacks by providing, in a simple and inexpensive manner, a novel friction unit which is of increased stiffness or rigidity, in which the thrust ring is of simple form, with a guide ring and protected axially acting resilient means.

According to the invention in a first aspect, a unitary friction sub-assembly for a torsion damper, in particular for a motor vehicle friction clutch, of the kind comprising a guide ring for receiving circumferentially acting resilient members, and at least one drive ring adapted to make contact with a damper plate, the guide ring being acted on by axially acting resilient means, wherein the said drive ring and the said resilient means are mounted within a cavity which is delimited by the guide ring and by a closure ring secured to the guide ring, is characterised in that a first one of the elements comprising the closure ring and the guide ring has at its inner periphery at least two stop lugs for preventing rotation, the said stop lugs being directed axially towards the second one of the said elements comprising the guide ring and the closure ring, so as, by mating cooperation, to prevent the rotation of a thrust ring which is interposed between the said resilient means and the drive ring.

Thanks to the invention, the axially acting resilient means are protected by the closure ring, and the force exerted by these resilient means depend on the axial distance by which the guide ring and the closure ring are separated. This distance is generally invariable, because the stop lugs stiffen the friction unit that comprises the guide ring and the closure ring, so that this assembly is robust.

It will also be appreciated that the stop lugs which are provided in accordance with the invention facilitate the positioning in advance of the components which are mounted within the friction unit or unitary friction assembly, and that the inner periphery of these said components is protected thereby.

In addition, the stop lugs make it possible to fit the thrust ring in a simple axial movement, the thrust ring being of simple form. The same is true of the axially acting resilient means themselves, which can be simply fitted over the stop lug.

The stop lugs make it possible to provide a large number of different embodiments. Thus, it is possible to interpose the drive ring between two friction rings, each of which has a slot at its inner periphery, or a window, for meshing with the stop lug.

The friction rings do not need to be adhesively attached on the drive ring, and one of the said friction rings may constitute the above mentioned thrust ring.

It is of course possible to provide an arrangement with two drive rings, mounted for rotational movement with respect to the stop lugs, and three friction rings, one of which is interposed between the two drive rings, while another constitutes the thrust ring, and the third one constitutes a ring which is interposed between the closure ring and the drive ring concerned.

All of the foregoing considerations depend on the particular application and on the axial dimensioning of the cavity.

Preferably, each stop lug penetrates into an aperture in the element concerned comprising the closure ring or guide ring. The stop lugs are then elongated, which facilitates fitting of the various rings of the friction unit.

One feature of the invention is that the (or each) aperture which receives a stop lug or lugs enables an axially oriented annular flange to be formed at the inner periphery of the element having the aperture, this flange being adapted to cooperate (in centring relationship which may be local) with the bearing of a spacing ring which is interposed axially between the damper plate of the damper and the closure ring.

In this connection, this flange may be long enough to provide such centring without unduly increasing the size of the torsion damper, because such a flange is directed axially either towards the damper plate, that is to say in the direction away from the stop lugs, when it is fixed with respect to the guide ring, or else towards the guide ring when it is fixed with respect to the closure ring. In this last case, advantage can be taken of the space which is available between the damper plate and the guide ring.

The flange therefore protects the stop lugs, especially during handling operations of the friction unit before it has been finally fitted.

Preferably there is a radial clearance between the said flanges and stop lugs. This facilitates manufacture, because manufacturing tolerances which have to be observed for the guide ring do not need to be very precise, due to the radial clearance.

According to the invention in a further aspect, a torsion damper includes a friction unit according to the invention.

In one embodiment, the closure ring has at its outer periphery at least one radial fastening lug for securing it to the guide ring. It is this lug that determines geometrically the axial distance between the guide ring and the closure ring. In certain applications, this lug enables the closure ring to be secured by riveting to the guide ring.

In a modification, the fastening of the closure ring to the guide ring may be achieved by virtue of a plurality of the said stop lugs, which are bent back radially away from the axis of the assembly after having passed through the above mentioned apertures. These stop lugs may be arranged alternately with shorter axial lugs, which also serve to prevent rotation of the thrust ring and which are adapted to engage on the guide ring. The axial distance between the guide ring and the closure ring is thus determined geometrically by the shorter lugs. The gripping action which is exerted by the axially acting resilient means on the drive ring is then also determined by these shorter lugs.

In one procedure, this gripping action may be calibrated during the assembly operation. In this connection, in one modification, the closure ring only has stop lugs which pass through their associated apertures, and the closure ring is deformed so as to compress the resilient means until the desired gripping action is obtained, after which the ends of the lugs are bent back radially away from the axis of the assembly and into contact with the guide ring, so as to lock the closure ring into position. In this way, a unit is obtained which has an axial thickness determined by the resilient means, which within a torsion damper are stiffer than the other axially acting resilient means which work between the damper plate of the damper and a further guide ring.

In all of the foregoing arrangements, it is of course possible to reverse the structures, with the guide ring having the shorter lugs and/or the stop lugs then being bent back radially away from the axis of the assembly.

In one embodiment, the closure ring is arranged to make contact with plate elements, which are preferably of plastics material and which constitute spacing rings between the closure ring and the damper plate of the damper which includes the friction unit according to the invention. Two of these plate elements may be provided, on either side of the damper plate, the said plate elements having at their inner periphery a bearing in the form of a sleeve, which is fitted over a hub to which the damper plate is joined. These plate elements serve for the mounting of the low stiffness resilient members which work circumferentially between these latter and the damper plate.

According to another feature of the invention, each of these bearings of the plate elements is formed with a projection, which is preferably divided, and which is directed towards the axis of the assembly for fitting, with a clearance, in an associated groove which is formed for this purpose in the hub at its outer periphery. In this way it is possible to provide a sub-assembly comprising the two plate elements, the hub with its damper plate, and the low stiffness resilient means, with the plate elements being snap-fitted on to the hub by virtue of the above mentioned projections being snapped into the grooves in the hub. This represents a considerable simplification in the method of assembling the torsion damper, because the latter then comprises two unitary assemblies, namely the unitary assembly mentioned above having the plate elements, and the friction unit.

During the assembly operation, the resilient members of higher stiffness are fitted on to the drive ring or rings of the friction unit, and the other unitary assembly or sub-assembly, including the plate elements, is then fitted. Finally, a guide ring is fitted, with a further friction means being interposed. In this way the assembly operation is considerably simplified.

Various preferred embodiments of the invention will be described below, by way of example only and with reference to the accompanying drawings.

BRIEF DESCRIPTION OF THE DRAWINGS

FIG. 12 is a view in elevation showing the damper plate of the embodiment of FIGS. 8 and 9.

FIG. 13 is a partial view in axial cross section of a sub-assembly comprising the damper plate and hub in the embodiment of FIGS. 8 and 9.

FIG. 14 is a scrap view on a larger scale, repeating part of FIG. 13 so as to show more clearly a groove shown therein.

Figure 1:
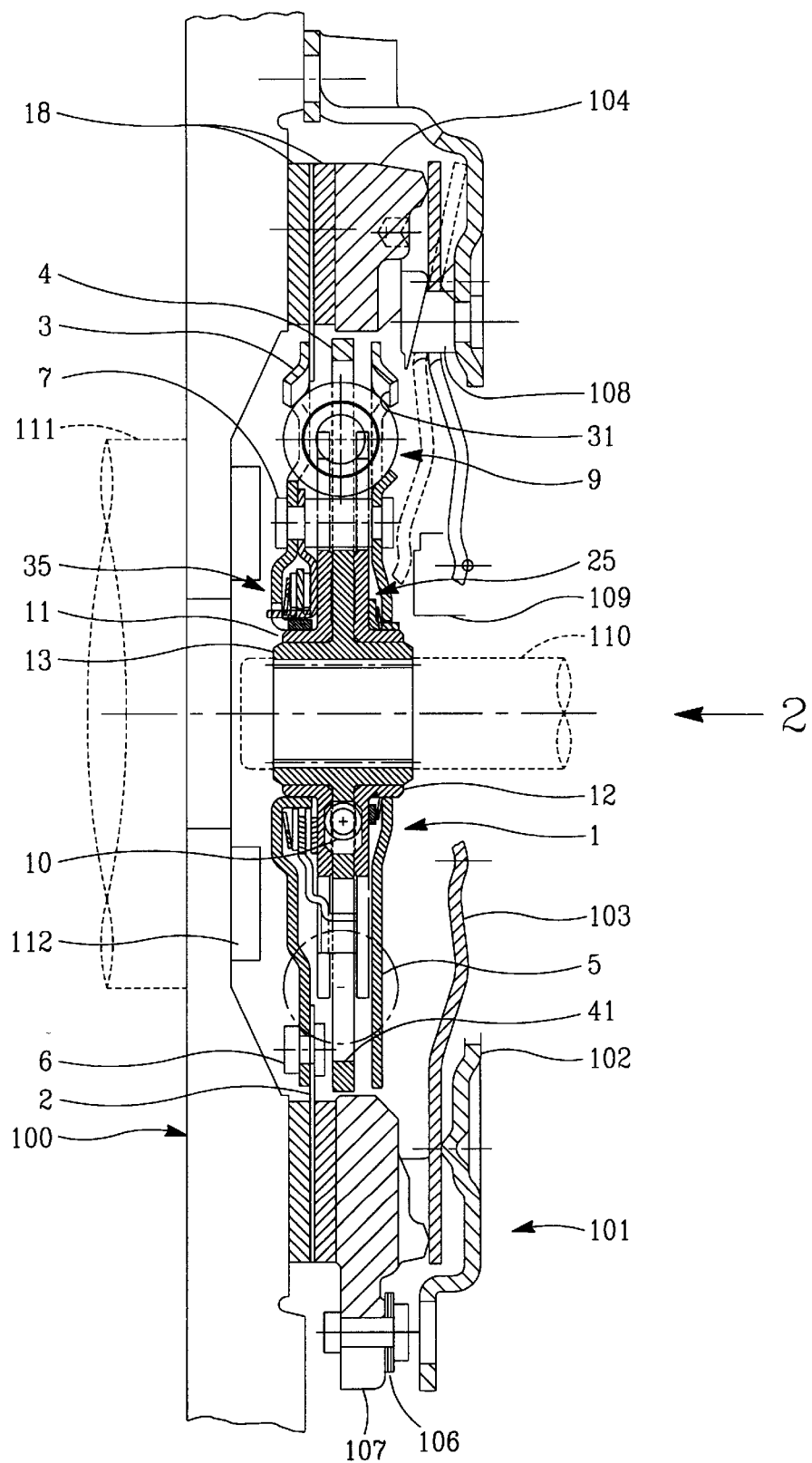
FIG. 1 is a view in axial cross section of a friction clutch which includes a sub-assembly in the form of a friction unit in accordance with the invention, fitted within the clutch.

DESCRIPTION OF PREFERRED
EMBODIMENTS OF THE INVENTION

The drawings show a friction clutch 1 for a motor vehicle, incorporating a torsion damper with a unitary friction sub-assembly, or friction unit 35. The friction clutch 1 in these examples, and as shown in particular in FIG. 1, comprises a clutch disc 2 having, secured on each of its faces, friction liners 18 which are arranged to be gripped in the usual way between a pressure plate 104 and a reaction plate 100 of the clutch, so as to transmit engine torque from the crankshaft 111 of the internal combustion engine of the motor vehicle to the input shaft 110 of the gearbox. To this end, the reaction plate 100 is secured by means of screw fasteners 112 on to the crankshaft 111, while the friction clutch 1 has a central hub 13 which is internally splined so as to couple it in rotation on the input shaft 110 of the gearbox.

The pressure plate 104 is part of a unitary clutch mechanism 101, which also includes a cover plate 102 in the form of a dished plate, together with a diaphragm 103 which is mounted on the cover plate 102 by means of spigot members 108, in such a way that it can tilt or deflect. The clutch mechanism 101 is carried on the reaction plate 100 through screw fasteners (not shown) inserted through the radial flange of the cover plate 102 of the clutch mechanism.

The diaphragm 103, constituting an axially acting resilient means, bears on the base of the cover plate 102, which has a central aperture, so as to urge the pressure plate 104 towards the reaction plate 100 and so to grip the liners 18 between the reaction and pressure plates, so that the engine torque is transmitted from the crankshaft 111 to the gearbox input shaft 110 through the friction clutch 1, in such a way as to damp out vibrations.

This clutch is of the kind which is disengaged by exerting an axial thrust on the diaphragm, i.e. it is a clutch of the "push off" type. This is achieved by means of a clutch release bearing 109, which exerts a thrust on the ends of the fingers of the diaphragm 103, so as to deflect the diaphragm 103 and cause it to cease acting on the pressure plate 104.

A set of tangentially oriented resilient tongues 106 then urge the pressure plate 104 towards the base of the cover plate 102, so as to release the friction liners 18. In the known way, each of the tongues 106 is for this purpose secured by riveting at one of its ends to a radial lug 107 of the pressure plate 104, being secured at its other end to the radial flange of the cover plate 102. The pressure plate 104 is thus fixed to the cover plate 102, for rotation with the latter, while being movable in axial linear movement with respect to the latter.

Figure 3:
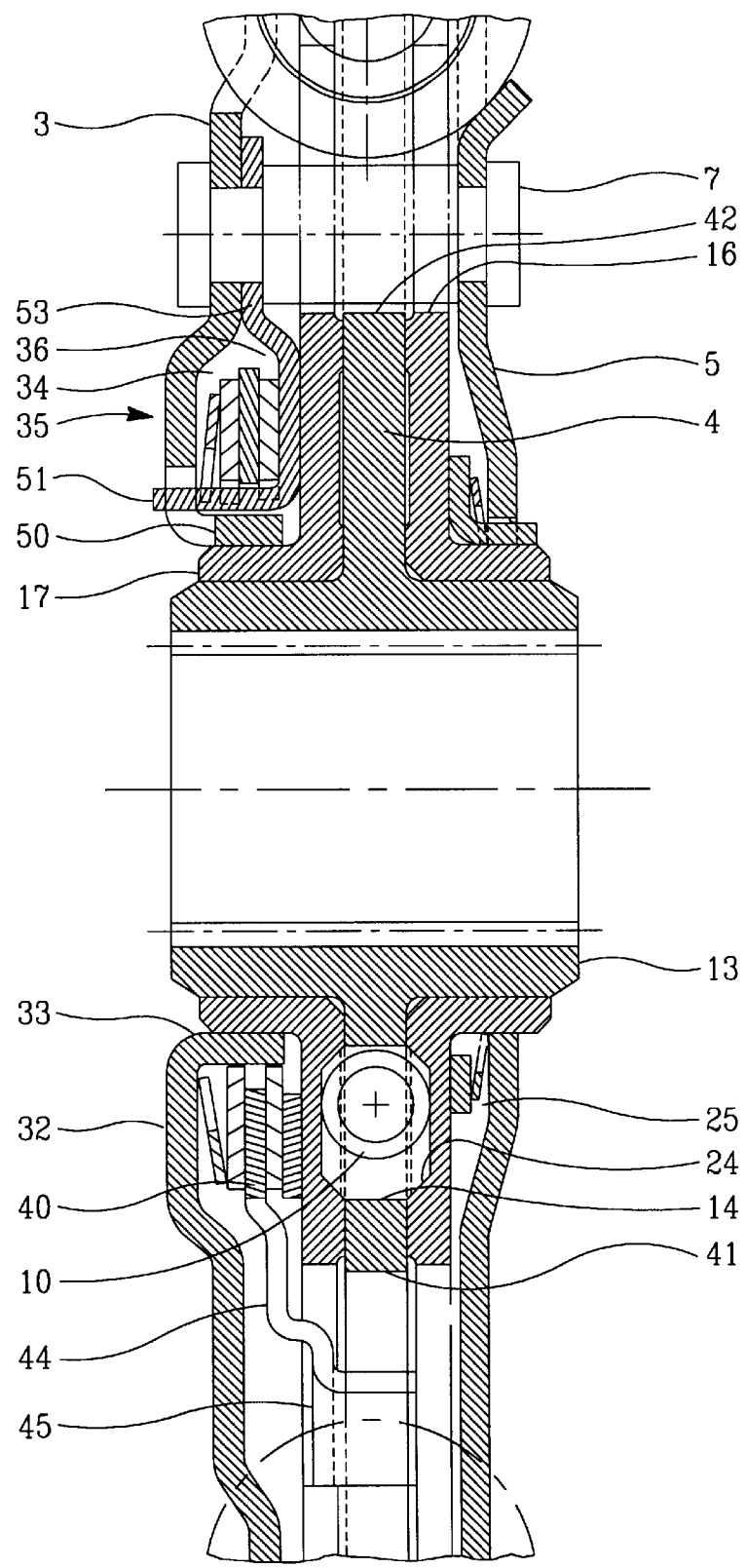
FIG. 3 is a partial view in cross section, showing on a larger scale the central part of the friction clutch seen in FIG. 1.
Figure 9:
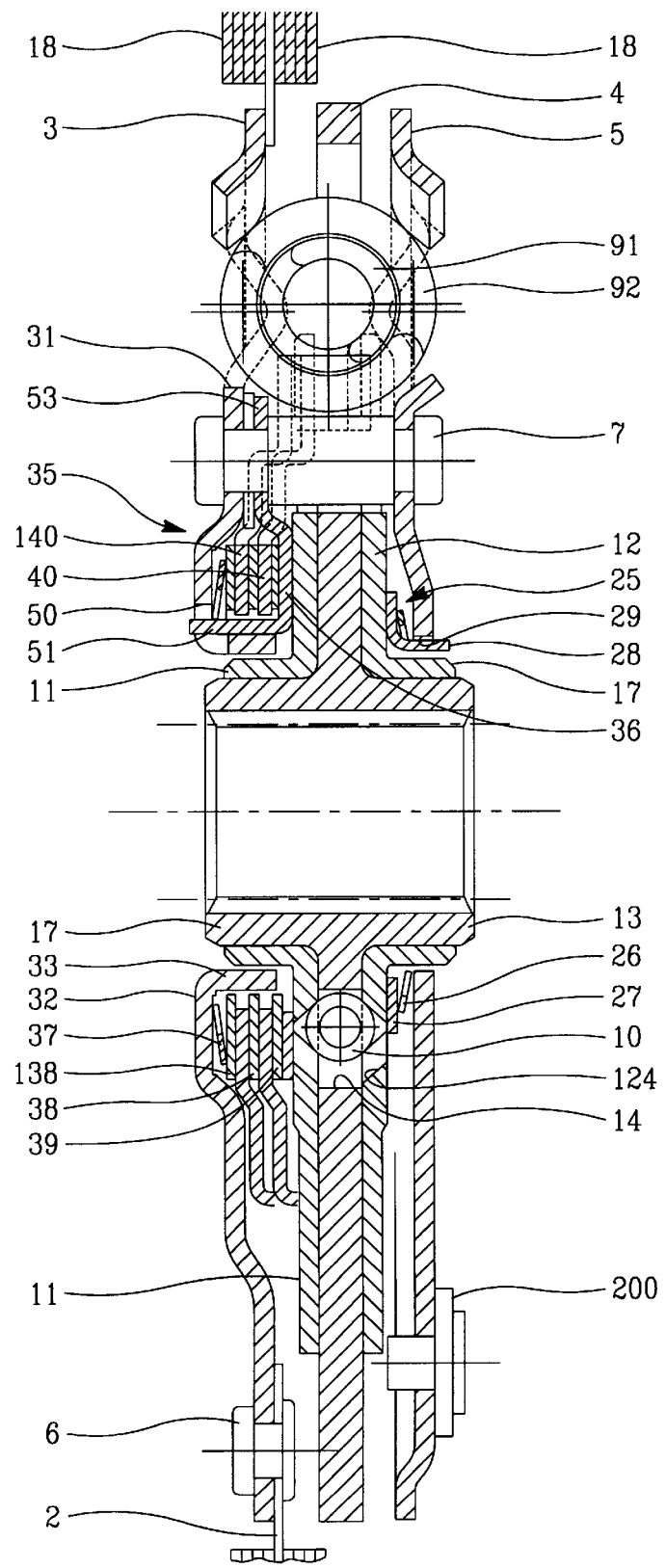
FIG. 9 is a view similar to FIG. 3, for the embodiment shown in FIG. 8.

The torsion damper is here an integral part of the friction clutch 1, so that the assembly as a whole can be regarded as consisting of a clutch and consisting of a torsion damper, so that these two expressions may be used interchangeably. Referring to FIGS. 1, 3 and 9 in particular, the torsion damper comprises two coaxial parts which are mounted for angular (circumferential) movement of one with respect to the other against the action of circumferentially acting resilient means 9, 10, and axially acting resilient means 25, 35. It should be noted that elements that are identical or substantially identical in all the embodiments shown in the drawings are given the same reference numerals throughout the drawings.

More precisely, one of the two coaxial parts of the torsion damper comprises the clutch disc 2 mentioned above, constituting the input element of the torsion damper, together with two guide rings 3 and 5 (which are here of metal), these guide rings having apertures for receiving the resilient members 9. The other coaxial part of the torsion damper comprises the hub 13, which constitutes the output element of the torsion damper, together with a damper plate 4, which is of generally transverse orientation and which is secured to the hub 13.

In this example the damper plate 4, which is again of metal, is integral with the metal hub 13, but in a modification it may be a separate component secured on the latter by seaming. The transversely oriented guide rings 3 and 5 surround the hub 13 and lie on either side of the damper plate 4, the guide rings and damper plate being parallel to each other. The clutch disc 2 is secured to the first guide ring 3 by means of rivets 6, while spacer elements in the form of spigot members 7, which are fitted radially inwardly of the rivets 6, join the two guide rings 3 and 5 together. For this purpose, the spigot members 7 extend through the damper plate 4, via windows 41 and 42 (see FIGS. 2 and 3) which are formed in the latter and in which a first series of the resilient members 9 are fitted. Further resilient members 10 are fitted radially inwardly of the members 9.

In this example, the members 9 and 10 consist of two series of coil springs working circumferentially, though at least some of these, and in particular the springs 10, may be in the form of blocks of elastic material such as rubber. More precisely, the members 9 are stiffer than the members 10, which are adapted to absorb vibrations in the general speed range associated with the slow running mode of the internal combustion engine; while the springs 9 are adapted for absorbing vibrations when the engine is running under load.

In the present example the springs 9 are spaced apart circumferentially at regular intervals on a common pitch circle, and are mounted in pairs 91, 92 (FIG. 2), with a circumferential clearance, in the windows 41 and 42 of the damper plate 4. These springs 9 are also received, but without any circumferential clearance here, in windows 31 which are formed in the metallic guide rings 3 and 5. The various windows therefore constitute housings for the springs 9. In a modification, these housings may consist of pressed out portions formed in the guide rings 3 and 5.

The windows 31 in the guide rings are arranged in facing relationship with the windows 41 and 42 of the damper plate. The window 41 has a circumferential width which is greater than that of the window 42, so as to enable the pairs of springs 91, 92 to act in a differential way. In this example there are four pairs of springs 91 and 92. The number of these pairs does of course depend on the particular application, and it will be understood that a single spring 92 may be mounted in a window 41, 42.

The springs 10 are mounted without any clearance in windows 14 formed in the damper plate 4, and in recesses 24 (FIG. 3) or 124 (FIG. 9) formed in motion transmission plates, or spacing rings, 11 and 12 in facing relationship with the windows 14 (FIG. 3) or 14, 114 in FIG. 12. The springs 10 are spaced apart at regular intervals on a common pitch circle around the axis of the assembly. In this example there are four springs 10. Here again, the number of these springs does of course depend on the particular application, and some of the springs 10 may be mounted with a clearance in the recesses 24 or in the windows 124, of the motion transmission plates, so that the springs 10 can be enabled to work in a differential manner.

Figure 10:
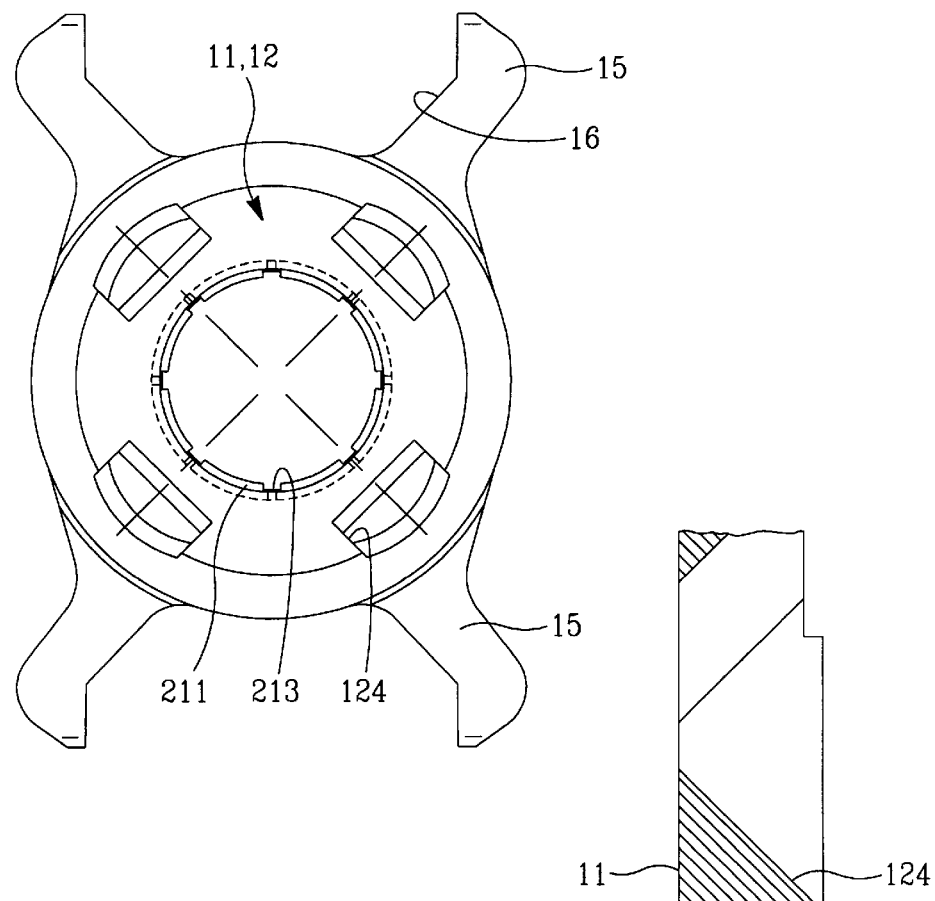
FIG. 10 is a view in elevation of a plate member in the embodiment of FIGS. 8 and 9.

In the embodiment shown in FIG. 3, the recesses 24 are in the form of pockets flanking the springs 10, which are mounted without any clearance in the windows 14 of the damper plate 4, but with a clearance in the recesses 24 of the plates 11 and 12. In the embodiment shown in FIGS. 8 to 14, the springs 10 are all mounted without any clearance in the windows 124 (see especially FIG. 10) of the motion transmission plates 11 and 12, with two of them being mounted without clearance in two windows 14 of the damper plate 4, and the other two with a clearance in two windows 114 of the damper plate 4, the windows 114 being larger than the windows 14.

The springs 10 thus work in a stepped or sequential way. However, all combinations are of course possible, so that for example the springs 10 can be fitted, in the general arrangement shown in FIG. 3, without any clearance in the windows 14 and in two of the recesses 24 (which can be in the form of windows themselves), and with a clearance in two further recesses 24.

The motion transmission plates 11 and 12 are made of a suitable plastics material, preferably reinforced with fibres, for example glass fibres, while the components 2, 3, 4, 5 and 13 are of metal.

The motion transmission plates 11 and 12 constitute spacing rings in a manner described below. The plates 11 and 12 are arranged on either side of the damper plate 4, being in frictional contact with the latter under the action of the friction means 25 and 35. In this example, the plates 11 and 12 are identical to each other and include at their outer periphery a sleeve portion 17 (see FIG. 3) which constitutes a centring bearing. The plates 11 and 12 thus have an L-shaped cross section, and they are fitted around the hub 13, being centred by their sleeve portions 17. At its outer periphery, each of the plates 11 and 12 is formed with at least one fork 15 (see FIGS. 2 and 4), for engagement with the circumferential ends of the pairs of springs 91 and 92 mounted in the window 42. This fork 15 has accordingly two radial arms which delimit slots 16 through which the metallic spigot members 7 pass. In this example there are two diametrically opposed forks 15, for balancing reasons (see FIGS. 2, 8 and 10). These forks are in engagement with the springs 91 and 92, which are mounted with a clearance in the windows 42, these latter being generally diametrically opposed to each other.

The friction means 25, 35 consist of a first friction device 25 together with the friction unit 35. The first friction device 25 is arranged between the second guide ring 5 and the motion transmission plate 12. The friction device 25 comprises a resilient ring 26, which is here in the form of a diaphragm, with a peripheral Belleville ring portion and radial fingers, together with a thrust ring 27 in contact with the motion transmission plate 12. The resilient ring 26 bears on the guide ring 5 so as to act on the thrust ring 27 and to urge the motion transmission plate 12 into contact with the damper plate 4 (see FIGS. 4 and 9).

The friction device 25 surrounds the bearing 17 of the motion transmission plate 12. The thrust ring 27 is mounted on the guide ring 5, for rotation with the latter, by means of axial lugs 28 which are received, with a radial clearance, in circumferentially complementary notches 29 which are formed in the inner periphery of the guide ring 5. In the embodiment shown in FIG. 4, the lugs 28 are centred by the bearing 17, and pass through the ring 26 via apertures formed in two consecutive internal fingers of the ring 26. There is a radial clearance between the lugs 28 and the base of the notches 29.

The friction unit 35, constituting a second friction device, is fitted between the other motion transmitting plate 11 and the guide ring 3. The friction unit 35 is so arranged that the spring (or diaphragm) 26 of the friction device 25, through the spigot members 7, causes the motion transmitting plate 11 to be gripped between the damper plate 4 and the friction unit 35.

Figure 2:
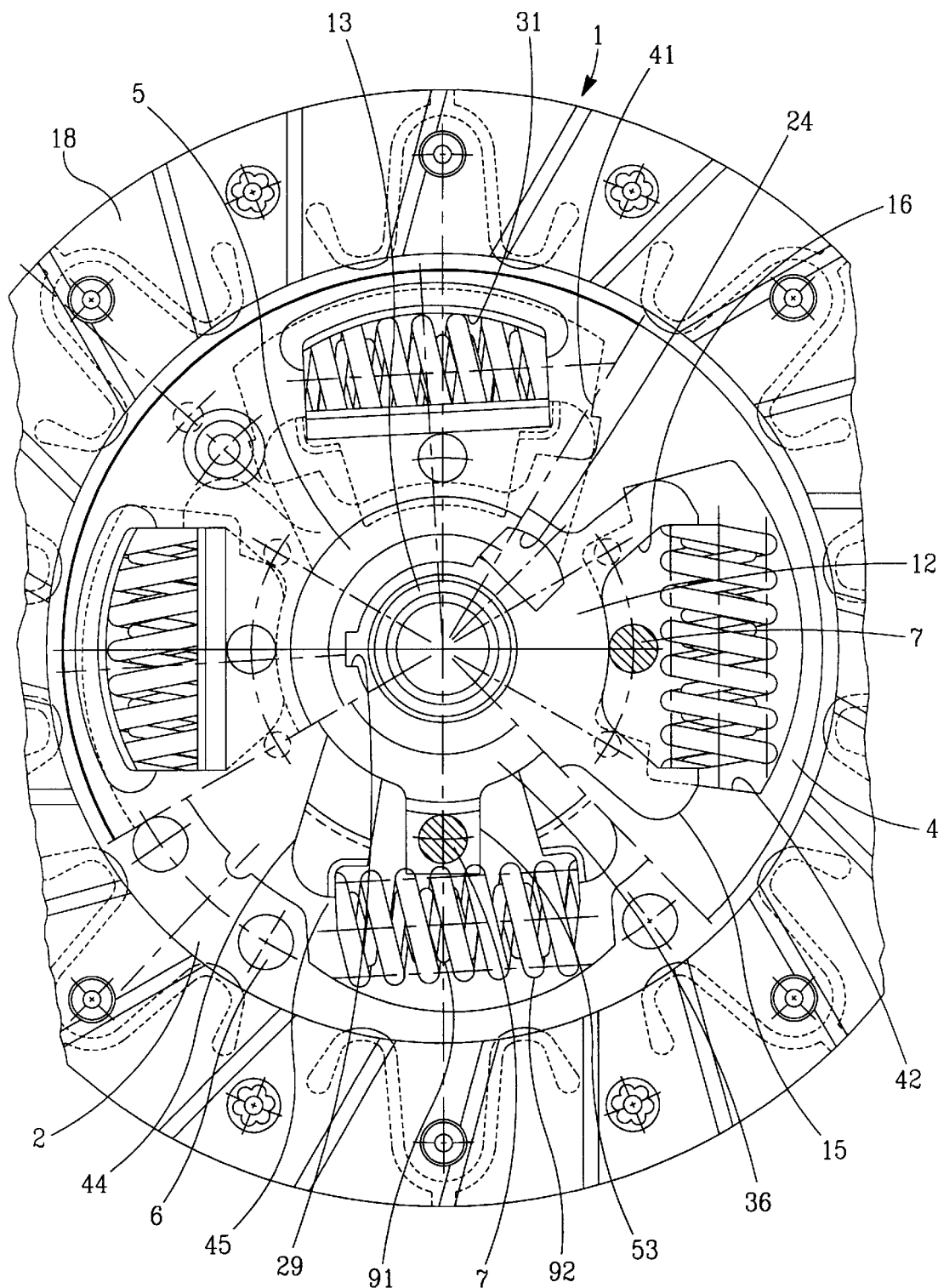
FIG. 2 is a partial view, seen in elevation, of the same friction clutch as seen in the direction of the arrow 2 in FIG. 1, partly cut away so as to show part of the drive ring and part of one of the motion transmitting plates.
Figure 4:
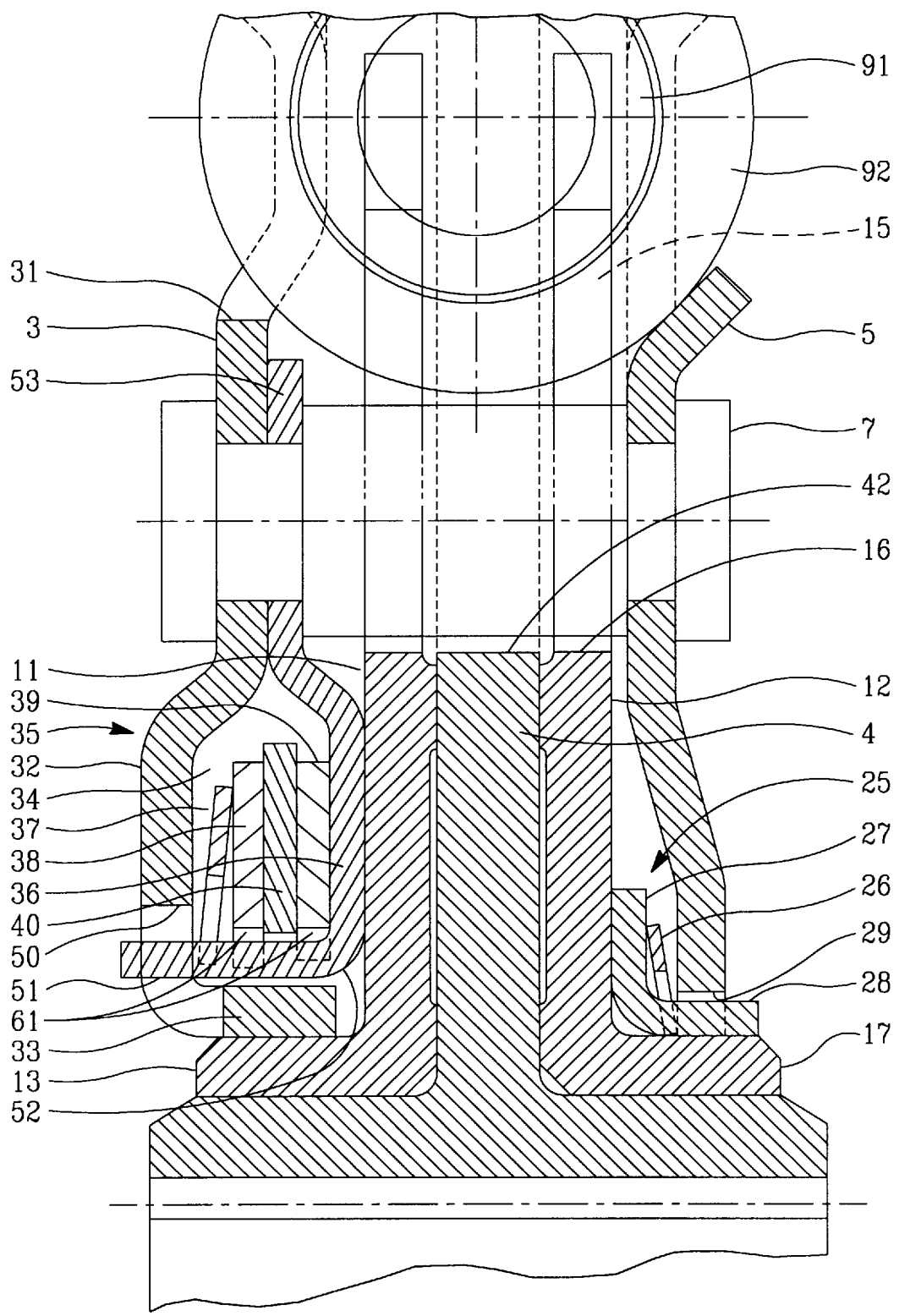
FIG. 4 is a view on an even larger scale repeating the upper part of FIG. 3.

With reference to FIGS. 3 and 4, the unit 35 comprises a metallic drive ring 40 which projects radially outwardly. The ring 40 includes forks 44, which are the mirror image of the forks 15 described above, but here the arms of the forks 44 have end portions 45, defining with the remainder of the arm an L-shaped or angle-iron cross section in the axial direction. These end portions 45 engage with the circumferential ends of the springs 91 and 92 mounted with a clearance in the windows 41. The end portions 45 extend lengthwise in the axial direction as shown in FIG. 3, and penetrate into the windows 41. These end portions 41 are arranged to interfere with the lateral edges of the windows 41, and are configured for this purpose as is best seen in FIG. 2.

The drive ring 40 therefore has two diametrically opposed forks 44, for engagement with the springs 91 and 92 in the windows 41, these latter being generally also diametrically opposed to each other. However, a single fork 44 could of course also be provided. In every case, one spigot member 7 passes through the fork 44 between the arms of the latter.

The torsion damper works in the following way.

(1) In a first phase of relative angular displacement between the clutch disc 2 and the hub 13, the guide rings 3 and 5 drive the motion transmitting plates 11 and 12, through the springs 91 and 92 mounted without circumferential clearance on the forks 15, in such a way that the low stiffness springs 10 are compressed, and that friction, loaded by the diaphragm ring 26 (which is configured accordingly) occurs between the motion transmission plates 11 and 12 on the one hand, and the damper plate 4 on the other, and also between the bearings 17 and the hub 13.

(2) In a second phase of the relative angular displacement, after the mounting clearance has been taken up, the pairs of springs 91 and 92, mounted in the appropriate windows 42, are compressed in such a way that the motion transmission plates 11 and 12 are immobilised with respect to the damper plate 4, with the springs 10 remaining in their compressed state. Friction then occurs between the friction unit 35 and the motion transmitting plate 11, and also between the plate 12 and the thrust ring 27. The diaphragm ring 26 is so designed that this will take place.

(3) In a third phase of the relative angular displacement, after the mounting clearance of the springs 91 and 92 has been taken up in the windows 41, these springs are compressed, and the end portions 45 of the arms 44 make contact with the corresponding lateral edges of the windows 41, so as to produce additional friction in a manner described below.

More precisely, the second friction device, i.e. the friction unit 35, constitutes a unitary friction assembly with the first guide ring 3, at the inner periphery of the latter. The unit 35, which is of the kind usually referred to as a hysteresis cassette, also includes a closure ring 36. As is best seen in FIG. 3, this closure ring 36 and the guide ring 3 together define a cavity 34.

The closure ring 36 in this example is arranged to cooperate frictionally with the motion transmitting plate 11 which, like the other similar plate 12, constitutes a spacing ring. The closure ring 36, which in this example is of metal, is provided at its inner periphery with at least two axially oriented stop lugs 51 for preventing rotation. These lugs 51 are directed axially towards the guide ring 3 and away from the damper plate 4 and plate 11. There are preferably at least three of these lugs 51. However, if only two lugs 51 are present, these are arranged in generally diametrically opposed relationship to each other.

In this example, each stop lug 51 penetrates into an associated aperture 50 which is formed for this purpose in the guide ring 3 at the inner periphery of the latter and radially outwardly of the spigot members. A radial and circumferential clearance exists between each stop lug 51 and the aperture 50. Each lug 51, by mating cooperation, prevents rotation of at least one thrust ring 38 (see FIG. 4) which is interposed between the drive ring 40 and at least one axially acting resilient ring 37, which will be described below. It will be appreciated that the stop lugs 51 in this example enhance the rigidity of the closure ring 36, and that the thrust ring 38 is of simple form.

At its inner periphery, the guide ring 3 has an axially oriented annular flange 33, which is directed towards the damper plate 4 and which is mounted coaxially on the bearing 17 of the motion transmission plate 11. It is this flange 33 which enables the guide rings 3 and 5 to be centred with respect to the hub 13, and this is why there is a radial clearance between the lugs 28 and the base of the notches 29. The flange 33 extends axially in the opposite direction from the stop lugs 51 of the closure ring 36. The annular flange 33 increases the rigidity of the guide ring 3, so that the unitary friction assembly mentioned above, comprising the friction unit 35, the guide ring 3, and the closure ring 36, is very rigid and is in no danger of opening up.

The aperture 50 for the stop lugs 51 of the closure ring 36 is formed in the bend which joins the centring flange 33 to the main part of the guide ring 3. The centring flange 33 is of substantial length, and is made inexpensively because it is formed in a portion which would normally constitute discarded material. In addition, the apertures 50 facilitate the bending of the flange 33, which protects the stop lugs 51 and the various components which are fitted within the cavity 34. However, the axial length of the flange 33 is smaller than the axial length of the stop lugs 51, which in this example pass right through the apertures 50. These lugs 51 are thinner than the guide ring 3, as is the closure ring 36 as a whole. In particular, this is made possible due to the flange 33 which masks the lugs 51. However, according to the particular application, it is possible to increase the thickness of the closure ring 36.

In addition, in a modification, it is possible to reverse the structures, with the closure ring 36 then having the flange 33 and the apertures 50, while the guide ring 3 has the lugs 51, which in this case, do not project with respect to the closure ring 36 or penetrate into a groove of the motion transmitting plate 11.

In this example a plurality of stop lugs 51, and therefore a plurality of apertures 50, are spaced apart at regular intervals. The closure ring 36 has at its outer periphery at least one radial fastening lug 53 for securing it to the guide ring 3 by means of the spigot members 7. In this example, one fastening lug 53 is provided for each spigot member 7 passing through the forks 44 of the drive ring 40. This again does of course depend on the particular application, as does the number of stop lugs 51 and apertures 50. In this embodiment, there are four radial lugs 53 (i.e. one for each spigot member 7), and eight axial stop lugs 51.

The closure ring 36 accordingly has at its inner periphery the form of an annular comb, with a bend 52 joining the comb portion to the remainder of the ring 36. At its outer periphery, the latter has the fastening lugs 53 projecting radially. In more general terms, the component comprising the guide ring 3 and closure ring 36, having the lugs 51, has the form of a comb with the junction bend 52, which is continuous circumferentially, joining it to the main portion of this component 3, 5.

The lugs 51 and 53 are of rectangular cross section, and are flat and thin. In a modification, it is the guide ring 3 that has the form of a comb, with the closure ring 36 having the flange 33.

The drive ring 40 is mounted in the cavity 34, together with the axially acting resilient ring 37 and the two friction rings 38 and 39, which are arranged on either side of the drive ring 40. The ring 37 is the mirror image of the resilient ring 26 (FIG. 4), and in this example the ring 37 is in the form of a diaphragm having a peripheral portion in the form of a Belleville ring, which is extended radially inwardly by fingers, some of which are slotted in facing relationship with the stop lugs 51, so that the latter can pass through them, the stop lugs 51 being arranged circumferentially in a complementary way. This provides rotational coupling of the ring 37 with the lugs 51. The ring 37 then has at least one finger which meshes with a corresponding lug 51.

The rings 38 and 39 have at their inner periphery slots 61 through which the stop lugs 51 pass, again in a complementary manner circumferentially, and for rotational coupling of the rings 38, 39 with the stop lugs 51 and the closure ring 36. Each lug 51 meshes with a slot 61 of the ring 38, 39 concerned, for preventing rotation of the latter. The drive ring 40 surrounds the stop lugs 51 with a radial clearance, being centred by the pairs of springs 91 and 92 via its forks 44. It is mounted for movement in relation with respect to the stop lugs 51.

In general terms, it will be appreciated that the stop lugs 51 facilitate the positioning, in advance, of the rings 37 to 40 in the cavity 34.

In this example, the resilient ring 37 bears on the guide ring 3 and on the thrust ring 38, so as to provide an axial gripping force for gripping of the drive ring 40 between the two rings 38 and 39, the ring 39 being in contact with the closure ring 36. The ring 38 then acts as a thrust ring, prevented from rotating by the stop lugs 51. The drive ring 40 is interposed between the rings 38 and 39, and fitting is carried out by threading the components 37, 38, 39 and 40 axially on to the stop lugs 51 before the fastening lugs 53 are secured.

In this way, gripping of the drive ring 40 is well controlled by the distance between the closure ring 36 and the guide ring 3, and no relative movement that might give rise to wear and/or noise can occur in the circumferential direction between the rings 38 and 37, so that the rings 38 and 39 are not of metal in this example.

It will be appreciated that this gripping action is very well controlled because the components 3 and 36 are stiffened at their inner peripheries, respectively by the flange 33 and by the stop lugs 51 and junction bend 52. Accordingly the danger of the cavity 34 opening out is minimised.

In all cases there is a radial clearance between the stop lugs 51 and the flange 33 parallel to the latter, in order to avoid any interference between this flange and the rings 37, 38 and 39, and to facilitate manufacture, especially as regards conformity with manufacturing tolerances.

The structures can of course be reversed, with the ring 37 bearing on the closure ring 36 and the ring 39 on the guide ring 3. It is even possible to increase the number of friction rings 38, 39 and the number of drive rings 40, as is for example described below with respect to the embodiment shown in FIGS. 8 to 14.

One drive ring 40 may be associated with each pair of springs 91 or 92 mounted in the windows 41. In that case, there are three friction rings and two drive rings arranged in axial succession.

As will have been understood from the foregoing, the arrangement shown in the drawings is of advantage because it prevents any metal to metal friction between the rings 36 and 40, and it leads to the least possible deformation of the sinuous forks 44 of the drive ring 40. The forks 44 in this example are offset axially with respect to the main friction part of the thrust ring 40, i.e. that which is arranged to make frictional contact against the rings 38 and 39.

Although the ring 40 is arranged to induce friction in contact with the rings 38 and 39, it may of course be arranged to do so directly against the closure ring 36.

The guide ring 3 is deformed at its inner periphery and has a portion 32 which contains the apertures 50, and which is offset axially away from the damper plate 4 and closure plate 36. Similarly, the fastening lugs 53 are offset axially towards the guide ring 3, with respect to the main part of the closure ring 36.

The fastening lugs 53 and the offset portion 32 are joined by sinuous portions to the main part of the closure ring 36 and to the main part of the guide ring 3 respectively, the lugs 53 being abutted to the ring 3. The sinuous portions of the lug 53 are robust enough to resist the gripping force which is exerted by the resilient diaphragm 26. These portions stiffen the ring 36, as does the bend 52.

It is thus possible to control the volume of the cavity 34. It will be appreciated that the closure ring 36 is made easily by press-forming (blanking and bending), as is the guide ring 3, which differs from the other guide ring 5 in regard to its inner periphery. The inner periphery of the guide ring 5 is also offset axially away from the damper plate 4, in order to accommodate the friction device 25. Thus, in the second phase of the relative angular displacement between the two parts of the torsion damper, i.e. between the clutch disc 2 and the hub 13, the flange 33 is brought into frictional engagement against the bearing 17, and the closure ring 36 undergoes friction against the motion transmitting plate 11, the latter being thicker than the drive ring 40, so that it can come into engagement with the springs 91 and 92. The same applies during the third phase of the angular displacement, during which relative movement, in which friction is controlled by the ring 37, takes place between the drive ring 40 (acting differentially) and the rings 38 and 39.

The present invention is of course not limited to the embodiments described up to this point. In particular, as mentioned above, it is possible to reverse the structures, with the guide ring 3 having the stop lugs and the closure ring having the flange 33 surrounded by the stop lugs 51. In all cases, however, the stop lugs 51 and the flange 33 extend axially in opposite directions.

The present invention is applicable to a friction clutch of the kind which is described in French patent specification FR 2 370 902A and the corresponding U.S. Pat. No. 4,222,475, having six springs which are spaced apart circumferentially. In that case, the spacing ring associated with the friction unit 35 (or hysteresis cassette) does not have any fork at its outer periphery, and the inner springs 10 are omitted, some of the outer springs 9 being in engagement with windows formed in the damper plate 4. The friction device 25 is in this case modified, being then of the type shown in FIG. 8 of the documents just mentioned, with one single spacing ring, constituting a bearing, being then provided. In this case, specific rivets are provided for the purpose of securing the closure ring 36, the spacer elements being fitted at the outer periphery for fastening the clutch disc 2.

Figure 5:
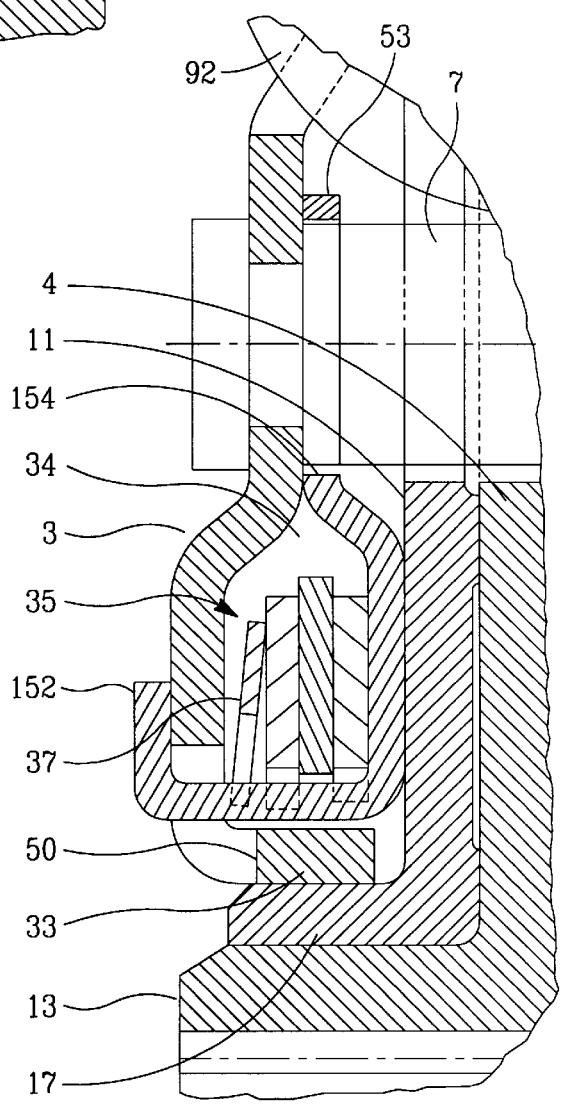
FIG. 5 is a view similar to part of FIG. 4, showing a second embodiment of the invention.

Instead of the end portions 45 arranged at right angles on the arms of the forks 44, it is possible to make use of axial lugs like the lugs 42 in FIG. 5 of U.S. Pat. No. 4,222,475, with these lugs meshing, with a clearance, with apertures in the damper plate 4 (i.e. the internal edge of the windows). Forks and axial lugs, meshing with a clearance with slots in the damper plate 4 so as to engage with the latter, are thus arranged alternately. In all cases, the drive ring 40 has drive means for engagement with the damper plate 4.

The pockets 24 may of course be replaced by windows 124 as shown in FIG. 9, with the springs 10 having in all cases a diameter which is smaller than the axial distance between the outer faces, opposed to the damper plate 4, of the motion transmitting plates 11 and 12.

The damper plate 4 could also mesh, with a clearance, with the hub 13, with the springs 10 working between the components 4 and 13, while the plates 11 and 12 are then without any arms.

The clutch disc 2 of the torsion damper may be secured directly on the reaction plate 100, and the hub 13 may mesh with the input shaft of a transmission unit, for example of the variable pulley type. In that case, there is no longer any clutch mechanism.

The ring 37 may be in the form of a resiliently deformable corrugated ring, having at its inner periphery fingers which mesh with the stop lugs 51 of the closure ring 36. It is of course possible to provide a plurality of resilient rings mounted in series. In particular, two Belleville rings with fingers inclined in opposite directions may be provided. In that case, these rings are in contact with each other through their outer peripheries, and the elastic load is well controlled.

The fastening lugs 53 may be secured to the guide ring 3 by welding. Also, at the level of the stop lugs 51, it is possible to provide, alternately with each other, long lugs 51 which penetrate into the apertures 51, and shorter axially oriented lugs (which can be seen at 151 in FIG. 7), which project from the inner periphery of the closure ring 36 and which bear on the guide ring 3, or vice versa.

Figure 7:
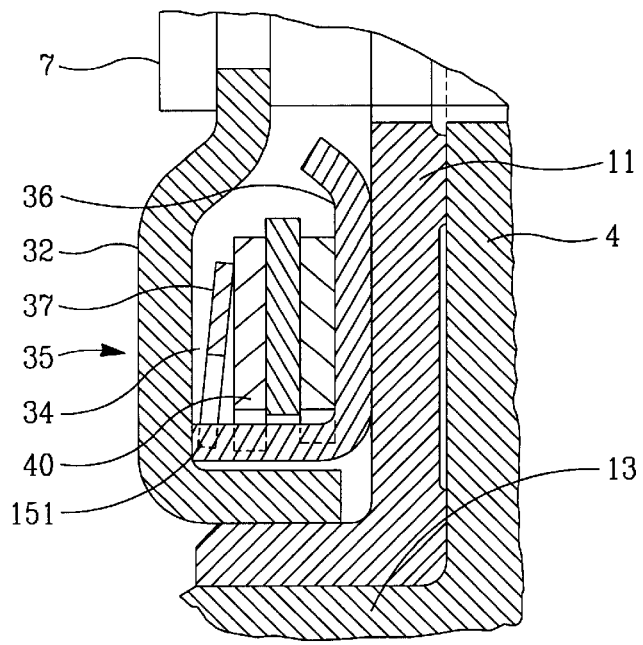
FIG. 7 is a view similar to part of FIG. 4 but showing a fourth embodiment of the invention.

Thus, with reference to FIG. 7, four long lugs penetrate into four apertures, and these alternate circumferentially with short lugs 151 which bear on the guide ring 3. In that case the resilient ring 26 may be arranged to exert a higher load.

In a modification, the ends of the lugs 51 may be formed with shoulders. In that case, the lugs 51 may have a T-shaped end portion, the central portion of which penetrates into the aperture 50 while its wings bear on the guide ring 3.

In a further modification, shown in FIG. 5, a clearance is provided between the spigot members and the fastening holes 154 which are provided in the fastening lugs 53 for accommodating the shanks of the spigot members 7. In this case the stop lugs 51 penetrate circumferentially in a complementary manner, in this example with a fitting clearance, into the apertures 50, so as to prevent the closure ring 36 from rotating. As a result, the stop lugs 51 mesh with the apertures. In this case, it is possible to apply seaming to the stop lugs 51. To this end, the axial end portion 152 of each lug 51 is bent back radially away from the axis of the assembly.

The presence of the fastening lugs 53 is not mandatory. In this connection (see FIGS. 6 and 7), it is sufficient to arrange, in circumferential alternation, short lugs 151 as mentioned above, bearing on the guide ring 3, and long lugs 51 which are bent back radially away from the axis of the assembly.

In a further modification the lugs 51 are shouldered. In the preceding cases, the lugs 51 or 151 secure the closure ring 36 to the guide ring 3. When the structures are reversed, a groove can be arranged in the spacer ring 11, into which the bent-back ends 152 of the guide ring 3 penetrate, so reducing axial size.

The drive ring 40 may be fixed with respect to the friction rings 38 and 39, these being without the slots 61. The rings 38 and 39 then surround the lugs 51 with a radial clearance, while an additional thrust ring, meshing with the stop lugs 51 through the above mentioned slots 61, is then interposed axially between the rings 37 and 38.

Having regard to the presence of this thrust ring, it is possible to provide a single friction ring which is interposed between the closure ring 36 and the thrust ring, this single ring carrying at its outer periphery (for example applied by moulding on to the ring itself) the metallic forks 44 and 45. In the drawings, it is of course possible to secure the ring 39, thus not having the slot 61, on the ring 36 adhesively, as illustrated in FIG. 7.

The slots 61 may be replaced by windows in the case in which the radial clearance between the flange and the lugs 51 permits it.

In all cases, rotation is prevented by a mating cooperation between the axial stop lugs 51 and the appropriate ring or rings 37 to 39.

Figure 6:
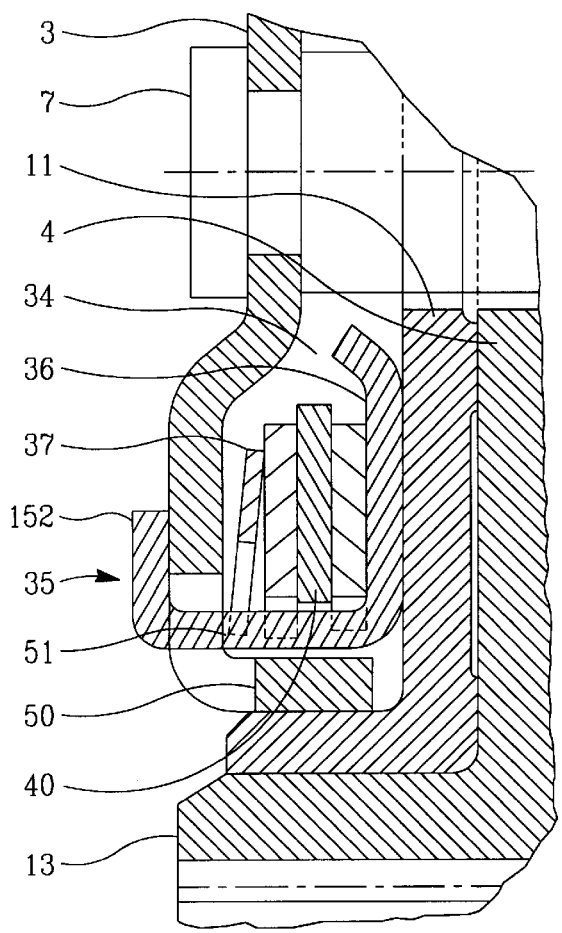
FIG. 6 is a view similar to part of FIG. 4 and showing a third embodiment of the invention.

In a further modification, the closure ring 36 of FIG. 6 does not have the lugs 151 of FIG. 7. In this case, the end portions 152 of the lugs 51 are no longer bent back, and a tool is used to apply pressure on the closure ring 36 so as to compress the various components contained within the cavity 34, against the load exerted by the resilient ring 37, which adjusts the calibration of the ring 40. Once this load has reached the value which is desired in order to exert the suitable force on the drive ring 40, and to regulate hysteresis in the desired manner, the movement of the tool is stopped, and the end portion 152 of the lugs 51 is bent back radially away from the axis of the assembly and into contact with the guide ring 3. In this way a unitary friction sub-assembly is obtained, in which the gripping force exerted on the drive ring is set at a desired value.

It will be noted that in operation, the ring 37 is not deflected by the ring 26 of FIG. 4, because the ring 26 is so calibrated that it does not obliterate the action of the low stiffness resilient means 10, while it does enable the motion transmitting plates 11 and 12 to be immobilised by friction during the second and third phases of the relative angular displacement between the clutch disc 2 and the hub 13. The force exerted by the ring 26 is accordingly lower than the force exerted by the ring 37.

It will also be noted that in FIG. 7, the calibration of the ring 37 is determined geometrically by means of the lugs 151. In FIGS. 4 and 5, the calibration of the ring 37 is determined by means of the radial fastening lugs 53, which in all cases are engaged on the spigot members 7, with or without a clearance. The closure ring 36 is thus attached to the guide ring 3 through its radial fastening lugs, which, it should be noted, may be welded on to the guide ring.

With reference to FIG. 2, it should be noted that the axis of symmetry passes through two diametrically opposed spigot members 7 which are offset circumferentially with respect to the axis of symmetry that passes through two pairs of diametrically opposed springs 91 and 92, in order to increase the material which is present between two consecutive windows 41, and so to stiffen the damper plate 4.

It is not mandatory to provide the deformation 32: whether or not it is provided depends on particular applications.

With reference now to FIGS. 8 to 14, in this embodiment there is a sub-assembly which cannot be lost, and which can be handled and transported easily, and which comprises the motion transmitting plate 12, the damper plate 4 with its hub 13, and the low stiffness springs 10. To this end, each motion transmitting plate 11, 12 has at the free axial end of its bearing 17, at least one pointed projection 211 (see FIG. 11), which is arranged to penetrate into an associated groove 311 (see FIG. 13), which is formed in one of the ends of the hub 13, at the outer periphery of the latter.

Figure 11:
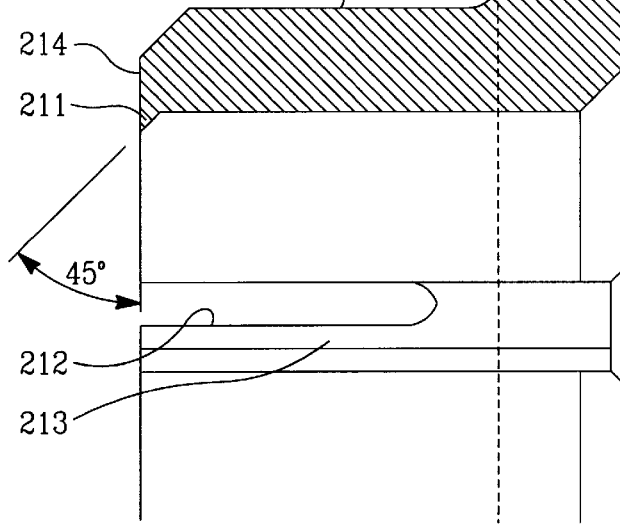
FIG. 11 is a partial view in axial cross section of a plate member in the embodiment of FIGS. 8 and 9.

In this example the projection 211 is in its preferred form, in that it is divided into a plurality of annular sectors which are separated by grooves 213 formed in the internal bore of the bearing 17. These grooves 213 reduce the thickness of the bearing 17 locally, and extend over the whole axial length of the latter, as shown in FIG. 11. The grooves 213 are formed with slots 212 which are shorter axially than the bearing 17, with each of these slots 212 having an open end at the free end of the bearing 17, the other end of each slot being closed, as can again be seen in FIG. 11 which shows the oblong shape of these slots 212.

The projections 211 extend radially towards the axis of the assembly, and, as can be seen in FIG. 11, they are delimited by a transverse edge which extends towards the axis of the assembly the terminal face 214 (i.e. the face which is furthest away from the transverse portion of the plate 11 or 12 concerned), and by an inclined portion which projects into the bore of the bearing 17.

As can be seen in FIGS. 13 and 14, the hub 13 has an annular groove 311 at each of its ends, for receiving the projections 211 of the plate 11 and plate 12 respectively. The axial ends of the hub 13 are chamfered in the known way. During fitting of the plates 11 and 12 on the hub 13, by threading them on to the latter, the inclined portions of the projections 211 accordingly cooperate with the appropriate chamfer, so that the projections are lifted and then penetrate into the associated grooves 311. In this way the plates 11 and 12 are snap-fitted on to the hub 13. This fitting operation is facilitated by the flexibility of the projections 211 due to the presence of the grooves 213 and their slots 212.

The projections 211 penetrate into their associated annular grooves 311 with radial and axial clearance. Thus, parasitic friction effects due to the presence of the projections 211 are minimised during operation of the torsion damper. More precisely, the grooves 311 are of matching shape to the projections 211. As seen in FIGS. 13 and 14, the grooves 311 have in cross section a transverse edge 314 which is joined through a rounded base 312 to an inclined edge 313. In this example, the angle between the edges 313 and 314 is 45 degrees, but the actual value of this angle will of course depend on the particular application. Accordingly, the transverse edge of the projection 211 is enabled to cooperate with the transverse edge 314 of the associated groove 311 after an axial clearance has been taken up.

It will be appreciated that it is easy to disconnect the plates 11 and 12 from the hub by reversing the snap-fitting operation, due in particular to the flexibility of the projections 211.

The above mentioned assembly, or sub-assembly, which cannot be lost and which can be handled and transported easily, and which comprises the damper plate 4, hub 13, plates 11 and 12 and springs 10, is able to be created due to the projections 211 directed towards the axis of the assembly and formed at the inner periphery of the bearings 17.

The presence of this sub-assembly, and the presence of the unitary friction sub-assembly comprising the friction unit 35 with the components 3 and 36, greatly facilitate the manufacture of the torsion damper. In this connection, both of these sub-assemblies can be manufactured in separate manufacturing locations, with the resilient members 91, 92 being subsequently fitted on the forks 44, 45 of the drive rings 40 and 140 described below. The sub-assembly that includes the plates 11 and 12 is subsequently fitted, and finally, the friction means 25 and the guide ring 5 are fitted, and the spigot members 7 can then be secured by a seaming or upsetting operation. The number of components to be handled during the final assembly operation is considerably reduced.

In this example, an operating clearance exists between the flange 33 and the bearing 17 of the plate 11. This operating clearance takes account of the misalignment that exists (as is well known) between the crankshaft 111 and the gearbox input shaft 110 shown in FIG. 1. By virtue of this clearance, the bearing 17 will come into local contact with the flange 33 in such a way that risks of jamming are minimised, and good local centring is obtained without any danger of jamming. The friction effects between the flange 37 and the bearing 17 are minimised. The guide rings 3 and 5 are centred by means of the flange 33.

It will also be noted that there is a radial clearance between the lugs 28 of the ring 27 and the bearing of the plate 12, with the guide rings 3 and 5 adopting the correct position with respect to the plates 11 and 12.

In this example, in the way already described above, the friction unit 35 has three friction rings 138, 38, 39, and two drive rings 40 and 140 which are mirror images of each other. The resilient means 37 bear on the ring 138 which constitutes the thrust ring and which meshes with the stop lug 51 as in FIGS. 1 to 7, as do the rings 38 and 39, with the ring 38 being interposed axially between the two drive rings 140 and 40, while the ring 39 is interposed axially between the drive ring 40 and the closure plate 36.

The stop lugs 51 here have their free ends shouldered in the way described below, with that portion of the lugs 51 that is of reduced width penetrating into the hole 50. These lugs 51 thus determine the spacing between the two rings 3 and 36, in such a way that the fastening lugs 53 are spaced away from the guide ring 3, being in contact with the larger diameter portions of the spigot members 7 (see FIG. 9).

The fitting of the sub-assembly 35 is facilitated due to the fact that the rings 138, 38 and 39, together with the ring 37, mesh with the stop lugs 51, so stiffening the closure ring 36.

It will be noted that the drive ring 140 is superimposed on the forks 15 of the motion transmitting plate 11, with this ring 140 engaging, through its forks 44 with their angled ends defining the axial end portions 45 directed towards the damper plate 4 and penetrating into the windows 42, with the springs 91 and 92 that are mounted in these windows 42.

The drive ring 40 is mounted, as in FIG. 2, in the windows 41. The windows 41 and 42 are best seen in FIG. 12. Each window 42 has a lateral edge 142 for cooperation, after a circumferential clearance has been taken up, with the end portions 45 of the ring 140.

The windows 41 also have lateral edges, and in the embodiment shown in FIG. 12, these edges are notched at 141, i.e. at their radially inner ends, so as to cooperate with the end portions 45 of the drive ring 40 after a circumferential clearance has been taken up. The two drive rings 40 and 140 are the mirror image of each other and have two forks 44 with diametrically opposed end portions 45.

Figure 8:
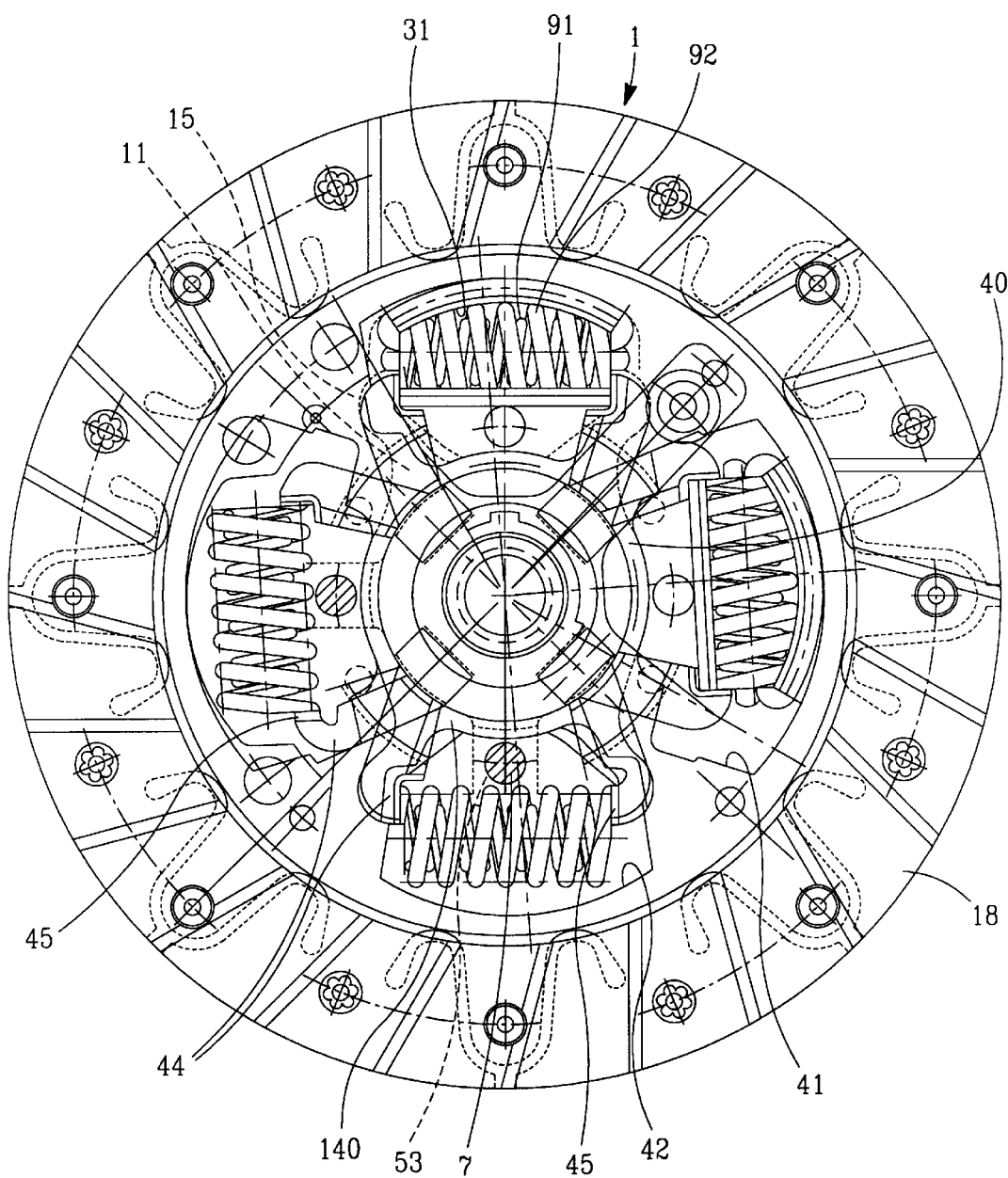
FIG. 8 is a view similar to FIG. 3, but showing a fifth embodiment of the invention.

Thus, in FIG. 8 the drive rings 40 and 140 operate differentially. To this end, the springs 41 and 42 which are mounted without any clearance in the windows 31 of the guide rings 3 and 5, are mounted in an asymmetrical manner in the windows 41 and 42 in the rest position of the torsion damper.

If, with reference to FIG. 8, it is assumed that in the direct sense (i.e. the mode of operation in which the engine drives the gearbox input shaft 110 and the road wheels of the vehicle), the friction liners 18 and the guide rings 3 and 5 rotate in the anti-clockwise direction with respect to the damper plate 4, then the end portions or lugs 45 of the drive rings 40 and 140 will come into contact at the same time with the edges 142 and 141 of the windows 42 and 41 respectively, in such a way that the drive ring 40 rubs frictionally between the ring 138 and the ring 38, and the drive ring 140 rubs frictionally between the ring 38 and the ring 39, in relative rotation with high friction.

In the opposite sense, or regenerative sense (in which the road wheels in effect drive the engine), the guide rings 3 and 5 will rotate in the clockwise direction in FIG. 8, so that the end portions 45 of the guide ring 40 make contact first with the edges 142, and the end portions 45 of the drive ring 140 will then make contact with the edges 141 of the windows 41. In this way, the drive rings work in a differential manner according to the direction of rotation, in such a way that it is possible to optimise the characteristic curve of the torsion damper so as to give the best possible absorption of vibrations.

The flanges 33 may of course be fitted on the bearing 17 without any clearance, and the bearing is accordingly elastic in the radial direction as is described, for example, in French patent specification FR 2 576 985A. Thus, in FIG. 15, some of the projections 211 have labyrinth slots 430 which enable the projections 211 to deform radially.

Figure 16:
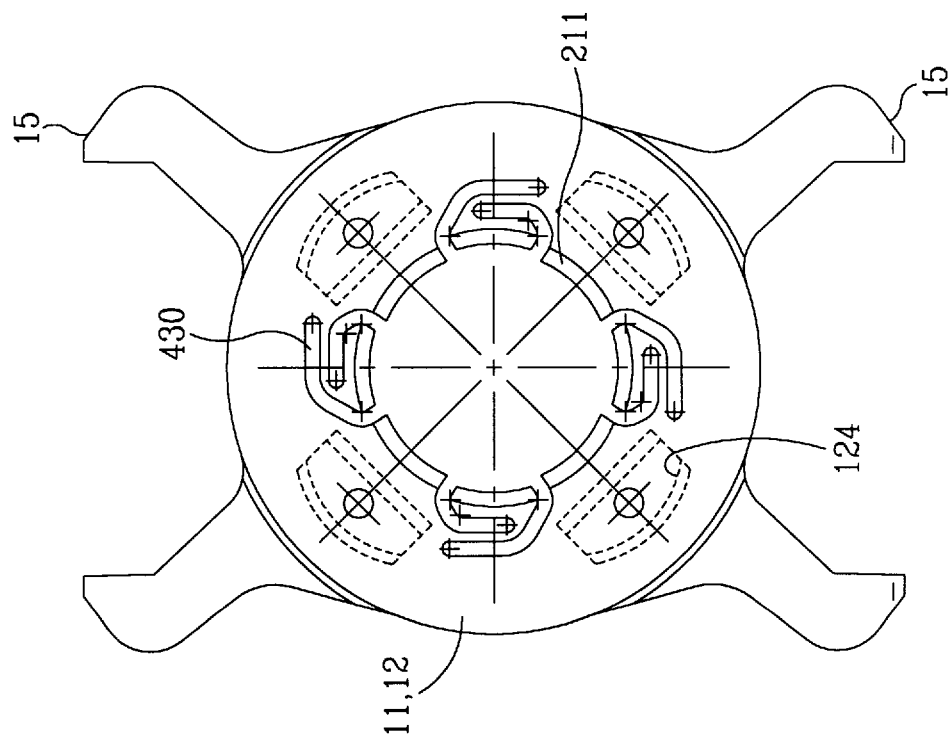
FIG. 16 is an elevation similar to FIG. 10 showing a plate member in a seventh embodiment of the invention.

In FIG. 16, the projections 211 are slotted in the region of their grooves, and a recess 431 is formed in each motion transmitting ring 11 or 12 at the adjacent ends of two consecutive projections 211. These projections are thus radially elastic.

In all cases it is possible to take up the radial offsets between the crankshaft 111 and the gearbox input shaft 110, without any risk of jamming.

Figure 15:
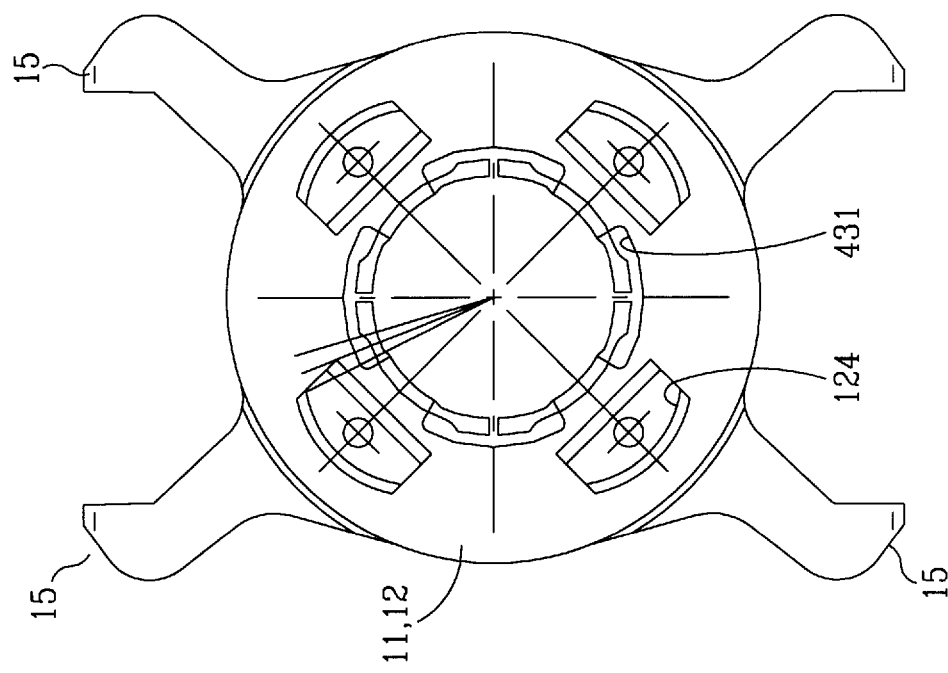
FIG. 15 is an elevation similar to FIG. 10, showing a plate member in a sixth embodiment of the invention.

In FIGS. 15 and 16, there can of course be an optional clearance, subsequently taken up locally, between the flange and the bearings of FIGS. 15 and 16.

In FIG. 12, it will be noted that the damper plate 4 has, in the known way, a telltale hole 400, which corresponds with holes (not shown) which are formed in the guide rings so that the damper plate 4 can be fitted in an indexed manner with respect to the rings 35.

What is claimed is:

1. A friction unit for a motor vehicle friction clutch torsion damper, comprising: a guide ring; circumferentially acting resilient means received in the guide ring; a damper plate coaxial with the guide ring; a drive ring for engaging the damper plate; axially acting resilient means in biassing engagement with the drive ring; and a closure ring fixed to the guide ring, the guide ring and closure ring together defining a cavity, said drive ring and axially acting resilient means being mounted in said cavity, wherein a first element selected from the closure ring and guide ring has at its inner periphery at least two stop lugs extending axially towards a second one of the elements selected from the guide ring and closure ring, the unit further including a thrust ring interposed between said axially acting resilient means and drive ring, whereby the stop lugs, by mating cooperation, prevent rotation of said thrust ring;

wherein said second element defines at least one aperture into which said stop lugs penetrate, and wherein said second element has at its inner periphery an axially oriented annular flange and defines a junction bend joining said flange to the remainder of said element, said at least one aperture in the latter being formed in the junction bend.

2. A friction unit according to claim 1, wherein said flange extends axially away from the stop lugs.

3. A friction unit according to claim 2, wherein said stop lugs and flange define a radial clearance between them.

4. A torsion damper comprising: a damper plate; a hub fixed to the damper plate; a spacing ring having a L-shaped cross section and defining at its inner periphery a bearing surrounding said hub; and a friction unit for a motor vehicle friction clutch torsion damper, comprising: a guide ring; circumferentially acting resilient means received in the guide ring; a damper plate coaxial with the guided ring; a drive ring for engaging the damper plate; axially acting resilient means in biassing engagement with the drive ring; and a closure ring fixed to the guide ring, the guide ring and closure ring together defining a cavity, said drive ring and axially acting resilient means being mounted in said cavity, wherein a first element selected from the closure ring and guide ring has at its inner periphery at least two stop lugs extending axially towards a second one of the elements selected from the guide ring and closure ring, the unit further including a thrust ring interposed between said axially acting resilient means and drive ring, whereby the stop lugs, by mating cooperation, prevent rotation of said thrust ring;

wherein said second element defines at least one aperture into which said stop lugs penetrate, and wherein said second element has at its inner periphery an axially oriented annular flange and defines a junction bend joining said flange to the remainder of said element, said at least one aperture in the latter being formed in the junction bend, the annular flange of said second element being mounted on said bearing, the closure ring being adapted to cooperate with the said spacing ring.

5. A damper according to claim 4, further including a second guide ring and a plurality of spacer members extending through the damper plate and joining the two guide rings together, wherein said spacing members secure the closure ring to the guide rings.

* * * * *